(No Model.)

J. NIELSEN & M. PEDERSEN.
CENTRIFUGAL MACHINE.

No. 330,345. Patented Nov. 10, 1885.

Witnesses
Wm. N. Denton
W. E. McElhinny

Inventors,
Jens Nielsen
Mikael Pedersen
By his Attorneys
Louis Bagger & Co.

UNITED STATES PATENT OFFICE.

JENS NIELSEN AND MIKAEL PEDERSEN, OF RÖSKILDE, DENMARK.

CENTRIFUGAL MACHINE.

SPECIFICATION forming part of Letters Patent No. 330,345, dated November 10, 1885.

Application filed June 16, 1885. Serial No. 168,866. (No model.)

*To all whom it may concern:*

Be it known that we, JENS NIELSEN and MIKAEL PEDERSEN, subjects of the King of Denmark, residing at Röskilde, in the Kingdom of Denmark, have invented certain new and useful Improvements in Centrifugal Machines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
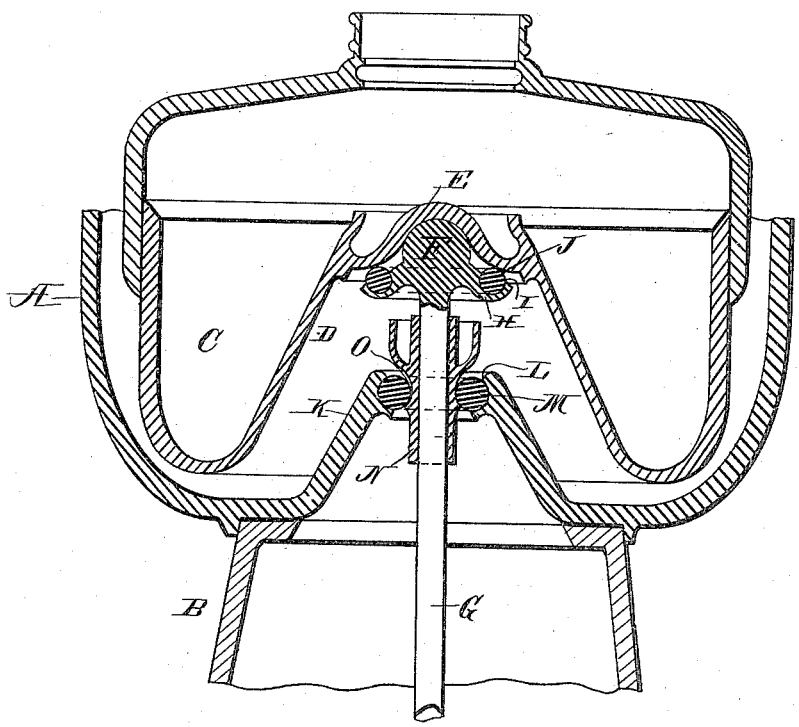
Figure 2:
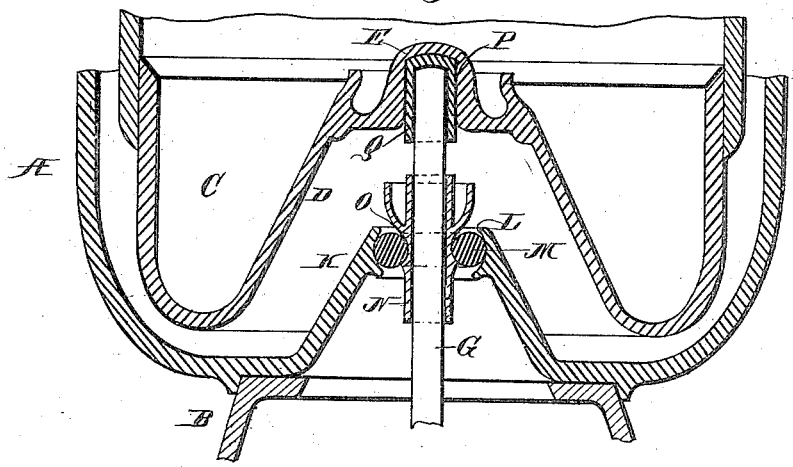

Figure 1 is a vertical sectional view of a centrifugal machine equipped with our improvements, and Fig. 2 is a vertical sectional view illustrating a modification in the construction of the same.

The same letters refer to the same parts in both the figures.

This invention relates to that class of centrifugal machines which are mounted upon vertical shafts or axes; and it has for its object to mount the rotating receptacle or container upon the said vertical shaft in such a manner that during operation, or when the container revolves at a high rate of speed, its center of gravity shall always lie in the vertical plane of the shaft or axis, thereby preventing the excessive wear upon or the wrenching of the latter, which is otherwise liable to occur, to the detriment of the working parts, which have sometimes been known to be seriously injured, or even destroyed, from this cause. Another object to be gained by our improvement is to facilitate the operation of the machine and enable it to be run with less expenditure of power and with less noise and vibration than has heretofore been the case.

With these ends in view our invention consists in the improved construction and arrangement of parts which will be hereinafter fully described, and particularly pointed out in the claims.

In the drawings hereto annexed, A designates the outer casing, which is mounted upon a suitable stand or support, B, and which accommodates the revolving container or receptacle C, and which is provided with a conical bottom, D, the under side of which is provided with a central ball-socket or bearing, E, adapted to receive the semi-spherical head F at the upper end of the shaft G, which said head is surrounded by an annular flange or collar, H, having a circumferential groove, I, in which is seated a ring or washer, J, of rubber or other suitable elastic material, against which presses the portion of the bottom D of the container which surrounds its ball-socket or bearing E.

The outer casing, A, of the machine is provided with a conical collar, K, the upper end or edge of which has an interior circumferential groove or recess, L, in which is seated an annular ring, M, of rubber or other suitable elastic material. This ring serves to support the sleeve N, which forms a box or bearing for the upper end of the shaft G, said sleeve being provided with an annular groove or recess, O, forming a seat for the inner circumference of the elastic ring M, which is thus retained securely in position. The lower end of the shaft is to be stepped or supported in a bearing of any suitable construction, which is not herein claimed, and which has not been shown in the drawings.

The operation of this invention will be readily understood from the foregoing description, taken in connection with the drawings hereto annexed.

When in operation a rotary motion at a high rate of speed is communicated to the shaft G, such rotary motion is imparted from the shaft to the container or receptacle through the elastic ring or washer J, which thus performs the function of a friction device. Said ring or washer will also act as an elastic cushion, which will support the revolving casing evenly and steadily, making the tendency of the center of gravity to remain constantly in the vertical plane of the axis of rotation. If, for any reason, the revolving casing should happen to be tilted, thereby throwing its center of gravity out of the vertical plane of the axis of rotation, the heavier side of said casing will tend to force the upper end of the shaft in a diametrically-opposite direction, thus causing the proper level to be almost instantly resumed by the continued revolution of the device.

In Fig. 2 of the drawings a modification in the construction of the above-described device has been shown, which consists in dispensing with the ball-and-socket joint at the upper end of the shaft G, which latter may either be cylindrical in shape or provided with a conical point. The bottom D of the receptacle C will be provided with a cylindrical box or socket, P, for the reception of the upper end of the shaft, which latter is provided with a cap, Q, of rubber or other elastic material, forming a seat or washer between the upper end of the shaft and its bearing. When the point of the shaft is conical, a sleeve may be substituted for the elastic cap Q. The bearing-sleeve N, for the upper end of the shaft, will be constructed and arranged in the same manner as shown in Fig. 1, and described in the foregoing. The operation of the device illustrated in this modification is precisely the same as that of the device above described, and illustrated in Fig. 1 of the drawings.

We would have it understood that in addition to the modification shown in Fig. 2 numerous other modifications which will readily suggest themselves to those skilled in the art to which the invention appertains may be resorted to in the practical manufacture of this invention. We therefore do not wish to be understood as limiting ourselves to the precise construction or modification herein shown and described, but reserve to ourselves the right to all other modifications which may be resorted to without departing from the spirit of our invention.

Having thus described our invention, we claim and desire to secure by Letters Patent of the United States—

1. The combination, with the vertical shaft or axis of a centrifugal machine, of the container or receptacle mounted loosely upon the upper end of such shaft or axis, an interposed ring, washer, or sleeve of rubber or other suitable elastic material, and a sleeve or bearing for the upper end of the said vertical shaft supported in or surrounded by an elastic or yielding ring or washer, substantially as and for the purpose herein shown and specified.

2. In a centrifugal machine, the combination of an outer casing having a conical sleeve, the vertical shaft extending through the said sleeve, and having a suitable box or bearing, an elastic washer interposed between the said box or bearing and the conical sleeve, and the container or receptacle mounted loosely upon the upper end of the said shaft, substantially in the manner and for the purpose herein shown and specified.

3. As an improvement in centrifugal machines, the combination of an outer box or casing, the bottom of which is provided with a conical sleeve or flange, the upper end of which is provided on its inner side with an annular groove or recess, a vertical shaft or axis extending through the said conical flange and having a sleeve or bearing provided with an annular groove registering with the annular groove in the upper end of the said flange, an elastic ring or washer seated in the said annular grooves and surrounding the said sleeve or bearing, a receptacle or container having a conical bottom provided with a bearing for the upper end of the vertical shaft, and an interposed ring, washer, or sleeve of rubber or other suitable elastic material, all arranged and operating substantially as and for the purpose herein shown and specified.

In testimony whereof we affix our signatures in presence of two witnesses.

JENS NIELSEN.
MIKAEL PEDERSEN.

Witnesses:
FREDERIK WOLFF,
CARL STENDER.